Dec. 4, 1956  M. ARON  2,773,219
LIGHT SENSITIVE RELAY CIRCUIT
Filed Nov. 10, 1954
FIG. 1
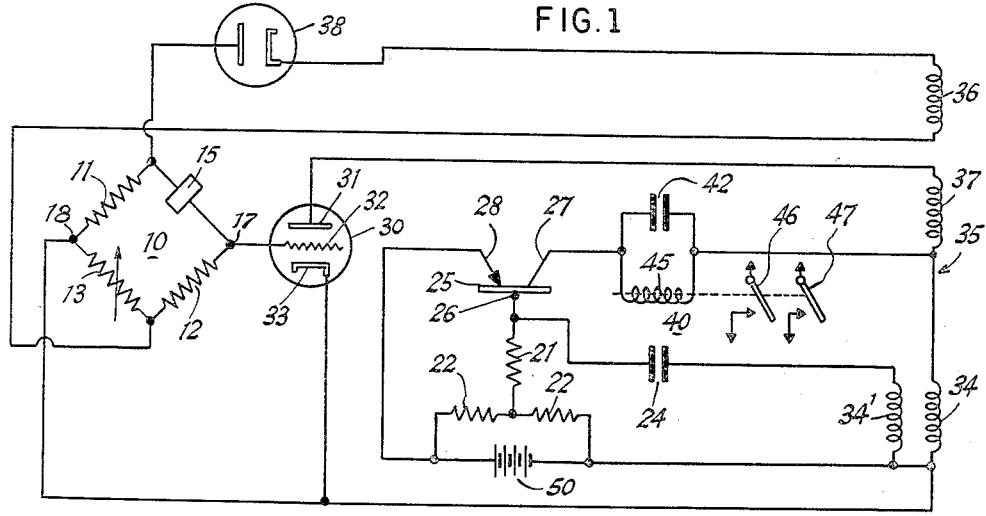
FIG. 2
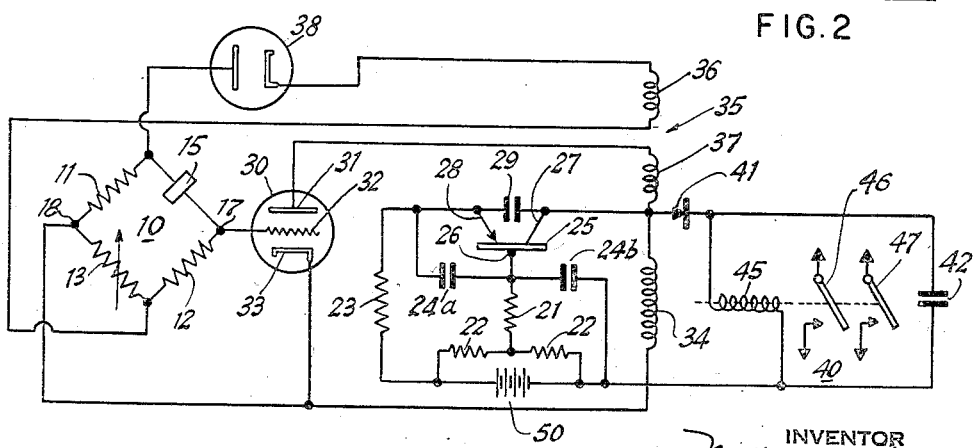
FIG. 3
INVENTOR
Mitchell Aron
BY
ATTORNEY

United States Patent Office 2,773,219
Patented Dec. 4, 1956

2,773,219

LIGHT SENSITIVE RELAY CIRCUIT

Mitchell Aron, Brooklyn, N. Y., assignor to Radio Receptor Company, Inc., Brooklyn, N. Y., a corporation of New York Application November 10, 1954, Serial No. 467,972

13 Claims. (Cl. 317—124)

This invention relates to signal responsive relay operating circuits and, more particularly, to such a circuit utilizing a high impedance, low energy sensitive device as a control signal element operating from a low voltage D. C. supply without the use of an auxiliary B supply.

The invention circuit is particularly useful as the control signal component of an automatic headlamp dimming arrangement for automotive vehicles, operating from the usual vehicle battery and electric system without requiring additional or auxiliary sources of power or potential.

Automotive vehicle headlamps are customarily provided with two filaments which may be called, respectively, the "high beam" filament and the "low beam" filament. These two filaments are so disposed, relative to the headlamp reflector surface, that the "low beam" light is directed somewhat downwardly so as to illuminate the route for only a relatively short distance in advance of the vehicle, while the "high beam" light is directed more nearly horizontally and illuminates the route for a substantial distance in advance of the vehicle. Frequently, the "high beam" filament has a candlepower rating substantially in excess of that of the "low beam" filament.

The "low beam" or "dim" light is used on lighted routes, when driving at lower speeds, and when passing an approaching vehicle, as its direction angle is such as not to affect substantially the vision of the driver of an approaching vehicle.

The "high beam" or "bright" light is used for driving on unlighted routes and for high speed driving. It has the disadvantage that its angle is such as to at least partially blind the driver of an oncoming vehicle. Consequently, safe drivers dim their headlamps, when sighting an approaching vehicle, by switching from the "high beam" to the "low beam."

Such selection of the "dim" or "bright" light is usually effected by operating a foot switch. On successive operations, this switch alternately energizes the "bright" and "dim" filaments. However, operation of this foot switch requires some attention from the driver, thereby creating a hazard when two vehicles are approaching each other at high speeds. Also, after the vehicles have passed each other, the headlamps should be switched back to "bright" to compensate for the suddenly decreased illumination of the route as the vehicles pass each other. The necessary attention to this switching also creates a hazard in high speed driving.

To eliminate these hazards, it has been proposed to dim the headlamps automatically in response to the light from an approaching vehicle, and systems have been designed to accomplish this automatic dimming. In general, such systems switch the headlamps from "bright" to "dim" when the light intensity on a sensing device at the front of the vehicle exceeds a pre-set value, and switch the headlamps back to "bright" when the light intensity on the sensing device is less than a predetermined value.

Such systems desirably should be so designed so that the headlamps operate in the usual manner when the foot switch is operated, and also are automatically dimmed (if on "bright") when a vehicle approaches. Furthermore, the system should control the headlamps in such manner that the operator can manually "lock" the headlamps in the "dim" position, but cannot manually "lock" the headlamps in the "bright" position. In other words, the lights should always be dimmed by the system whenever another vehicle approaches.

For this reason, it has been proposed that switching of the headlamps between "bright" and "dim" be effected by a relay arrangement which is conjointly controlled by a driver-operated foot switch and the automatic dimming system, with the arrangement being so designed that the automatic dimming system switches the headlamps to "dim" irrespective of whether or not the foot switch is operated to the "bright" position.

The relay control circuit of the invention, while not limited to such use, is particularly useful as the oncoming headlamp light responsive control component for operating the headlamp switching relay arrangement of an automatic headlamp dimming system.

In accordance with the invention, a resistance bridge is provided having in one arm an energy sensitive element such as a light-sensitive crystal of cadmium sulphide or cadmium selenide. The bridge is activated by the rectified output component of a transistor oscillator, and the bridge output drives a thermionic triode between the cathode and grid of the latter. The anode circuit of the triode is coupled to the tank coil of the oscillator, with the plate circuit impedance so adjusted that, when the triode grid bias is zero, the oscillator output is damped to only a fraction of its value when the triode is biased to cut-off. The collector current of the transistor oscillator is used to energize a relay which may control the operation of vehicle headlamps, for example.

The relay operating coil is connected in series with the collector of the transistor oscillator, and is suitably by-passed. The transistor oscillator is biased in such a manner that, when it is in full oscillation, the collector current is a maximum and, under damped conditions, the collector current is decreased.

With the energy-sensitive element in total darkness, the bridge is adjusted so that its output is slightly positive, causing the triode to damp the oscillator to maintain a reduced oscillator output which is sufficient to energize the bridge but insufficient to operate the relay. When the sensitive element is energized, the triode grid goes negative so that the triode plate circuit no longer damps the oscillator. The oscillator output thus increases and operates the relay as well as increasing the sensitivity of the bridge. Thus, once the relay is closed, the ratio of pull-in current to pull-out current of the relay, in combination with the increased sensitivity of the bridge, provides a convenient stepdown characteristic when the circuit is used in a headlamp dimming arrangement.

All of the necessary power and operating potentials are provided from a single low voltage D. C. source which may be the usual 6-volt battery-generator combination provided on automotive vehicles.

For an understanding of the invention principles, reference is made to the following description of typical embodiments thereof as illustrated in the accompanying drawings. In the drawings:

Fig. 1 is a schematic wiring diagram of one relay circuit embodying the invention; and Figs. 2 and 3 are similar diagrams of modified embodiments of the invention.

Referring to Fig. 1, the illustrated relay circuit includes a resistance bridge 10 which is energized from the rectified output of a transistor oscillator 20 and drives a thermionic triode 30. A relay 40 is energized by the collector current of oscillator 20. All the required power and operating potentials are provided from a single low voltage D. C. source 50 which may be the usual 6-volt automotive battery-generator combination.

Bridge 10 includes fixed resistors 11, 12, an adjustable resistance or potentiometer 13, and an energy sensitive element 15. The latter may be a light-sensitive crystal of cadmium sulphide or cadmium selenide.

Transistor oscillator 20 comprises a transistor 25 having a base electrode 26, a collector electrode 27, and an emitter electrode 28. Base electrode 26 is connected by a biasing resistor 21 to the junction of series resistors 22, 22 connected across battery 50.

The tank circuit of oscillator 20 includes a capacitance 24 connected in series between base electrode 26 and an inductance 34 coupled to one coupled winding 34 of a three-winding transformer 35 having additional windings 36 and 37. Winding 36 applies energizing potential for bridge 10, and winding 37 is connected in the anode or plate circuit of triode 30. For these purposes, winding 36 is connected across opposite junctions 14, 16 of bridge 10, with a diode 38 being interposed to rectify this component of the oscillator output, whereas winding 37 is connected to plate 31 of triode 30 and to collector 27 in series with operating coil 45 of relay 40. A condenser 42 is connected in parallel with coil 45.

Grid 32 of triode 30 is connected to junction 17 of bridge 10, and cathode 33 is connected to bridge junction 18 and one terminal of transformer winding 34. Emitter 28 is connected to positive terminal of battery 50 and inductance 34' is connected to the opposite terminal thereof. Relay coil 45, connected in series in the collector circuit of transistor 25, operates one or more relay contacts 46, 47 which may, for example, control the switching of automotive headlamps between "bright" and "dim."

With sensitive element 15 in total darkness, potentiometer 13 is adjusted to adjust bridge 10 so that the bridge output, applied between grid 32 and cathode 33 of triode 30, is such that grid 32 is slightly positive relative to cathode 33. The resultant impedance of the triode plate circuit, in series with transformer winding 37, damps oscillator 20 through the coupling of tank circuit winding 34'. Transistor oscillator 20 is biased in such a manner that, when damped, its collector current is a minimum but its output is sufficient to produce the driving potential for bridge 10.

When light of a predetermined intensity falls on element 15, the latter becomes more conductive. As a result, the effective resistance of bridge 10 is decreased, decreasing the impedance drop between grid 32 and cathode 33, and grid 32 goes negative so that triode 30 no longer damps oscillator 20. When oscillator 20 is not damped, its collector current is a maximum so that the collector current picks up relay 40 and maintains the relay energized as long as the light incident upon element 15 is above a preset value less than the initial operating value.

This "hold-in" at a lesser light value than required for "pull-in" is due to the increased sensitivity of bridge 10 due to the increased output of oscillator 20. This is important in automatic headlamp dimming arrangements. When the headlamps are automatically dimmed responsive to light from an approaching vehicle, the ambient light level is reduced, with further reduction upon responsive dimming of the approaching headlamps. Without any means for "holding-in" at a lesser light value than required for "pull-in," the control would thus switch the headlamps back to "bright." The ratio of the "pull-in" value for relay 40 to the "hold" value therefor, plus the increased sensitivity of bridge 10 when relay 40 is closed, provides the necessary safety margin for holding the headlamps on "dim" even though the light incident on element 15 is reduced.

The modified circuit shown in Fig. 2 is essentially similar to that of Fig. 1, and identical parts have been given the same reference characters, with corresponding parts having the same reference character primed. In the circuit of Fig. 2, a condenser 29 is connected between collector 27 and emitter 28, an emitter resistance 23 is connected between emitter 28 and battery 50, and capacitance 24 is divided into two capacitances 24a and 24b. Capacitance 24a is connected between emitter 28 and the junction of base electrode 26 and resistor 21. Capacitance 24b is connected between battery 50 and the junction of base electrode 26 and resistor 21. Inductance 34' is omitted, so that the tank circuit comprises winding 34 in parallel with capacitances 42a and 42b.

In the circuit of Fig. 3, relay coil 45, while still in series with collector 27, is in parallel with winding 34, rather than in series with this winding as in the circuits of Figs. 1 and 2. A diode 41 rectifies the relay operating current.

The circuits of Figs. 2 and 3 operate in the same manner as the circuits of Fig. 1.

While specific embodiments of the invention have been shown and described in detail to illustrate the application of the invention principles, it will be understood that the invention may be embodiment otherwise without departing from such principles.

What is claimed is:

1. A sensitive relay circuit comprising, in combination, a light energy sensing element having an electrical resistance variable as a function of the light energy received thereby; a transistor oscillator having an output circuit; a relay having an operating coil in series with the collector electrode of said transistor oscillator; a low voltage source of D. C. potential connected to supply operating potential to said oscillator; an amplifier having an input circuit including said element connected in series with the amplifier control component, and an output circuit coupled in series with said oscillator output circuit; means, including circuit connections for applying across said amplifier input circuit a rectified operating potential derived from said oscillator output circuit; and sensitivity adjustment means in series with said element in said input circuit to adjust the bias of said input circuit to a value such that said amplifier is conductive when no light is incident on said element; whereby, when no light is incident on said element, said amplifier will damp the oscillator output to a value insufficient to energize said coil.

2. A relay circuit as claimed in claim 1 including a condenser connected across said coil, of the relay.

3. A relay circuit as claimed in claim 1 including a condenser connected between the emitter and collector electrodes of said transistor oscillator.

4. A relay circuit as claimed in claim 1 including a condenser connected across said coil, and a condenser connected between the emitter and collector electrodes of said transistor oscillator.

5. A relay circuit as claimed in claim 1 including a rectifier in series with said coil.

6. A relay circuit as claimed in claim 1 in which said amplifier is a triode having a grid connected in series with said element and biased slightly positive when no light is incident on said element.

7. A relay circuit as claimed in claim 1 including a transformer having three coupled windings, one connected to apply potential across said amplifier input circuit, a second connected across the amplifier output circuit, and a third coupled to the tank inductance of said transistor oscillator.

8. A relay circuit as claimed in claim 7 in which the second and third windings are connected in series across the amplifier output circuit.

9. A relay circuit as claimed in claim 1 including a transformer having three coupled windings, one connected to apply potential across said amplifier input circuit, a second connected across the amplifier output circuit, and a third connected across the oscillator output circuit.

10. A relay circuit as claimed in claim 9 in which the second and third windings are connected in series across the amplifier output circuit.

11. A relay circuit as claimed in claim 1 in which the base electrode of the transistor is connected, through a first resistor, to the junction of a pair of resistors connected in shunt with said source.

12. A relay circuit as claimed in claim 1 where the operating potential for the energy sensitive element is supplied by a low voltage D. C. source.

13. A relay circuit as claimed in claim 1 in which said element is part of a resistance bridge connected in the output circuit of said amplifier and in the output circuit of said oscillator.

References Cited in the file of this patent

UNITED STATES PATENTS

| | | |
|---|---|---|
| 1,983,715 | Usselman | Dec. 11, 1934 |
| 2,050,737 | Schriever | Aug. 11, 1936 |
| 2,189,462 | Donle et al. | Feb. 6, 1940 |
| 2,512,658 | Levy | June 27, 1950 |
| 2,546,784 | Roggenstein | Mar. 27, 1951 |
| 2,554,124 | Salmont | May 22, 1951 |
| 2,590,826 | Schenck | Mar. 25, 1952 |